(No Model.)

W. E. MacLACHLAN.
BLIND STOP.

No. 478,262. Patented July 5, 1892.

Witnesses
W. H. Courtland
J. S. Killham.

Inventor
Wm E. MacLachlan
by P. F. Bourne
his Atty

UNITED STATES PATENT OFFICE.

WILLIAM E. MacLACHLAN, OF NEW YORK, N. Y.

BLIND-STOP.

SPECIFICATION forming part of Letters Patent No. 478,262, dated July 5, 1892.

Application filed October 17, 1891. Serial No. 409,016. (No model.)

*To all whom it may concern:*

Be it known that I, WILLIAM E. MACLACHLAN, a citizen of the United States, and a resident of New York city, in the county of New York and State of New York, have invented certain new and useful Improvements in Window-Blind-Slat Fasteners, of which the following is a specification.

The object of my invention is to provide means to manipulate the slats of window-blinds and also to hold them in any desired position without danger of their being moved by wind, &c.

The invention consists in the combination of the slats of a window-blind and an arm or handle carried thereby, with a segmental rack-bar affixed to the blind-frame and engaging with a spring on the arm or handle, so as to hold said handle in the desired position, as hereinafter more fully described.

The invention further consists in the novel details of improvement and the combinations of parts that will be more fully hereinafter set forth, and then pointed out in the claim.

Reference is to be had to the accompanying drawings, forming part hereof, wherein—

Figure 1:
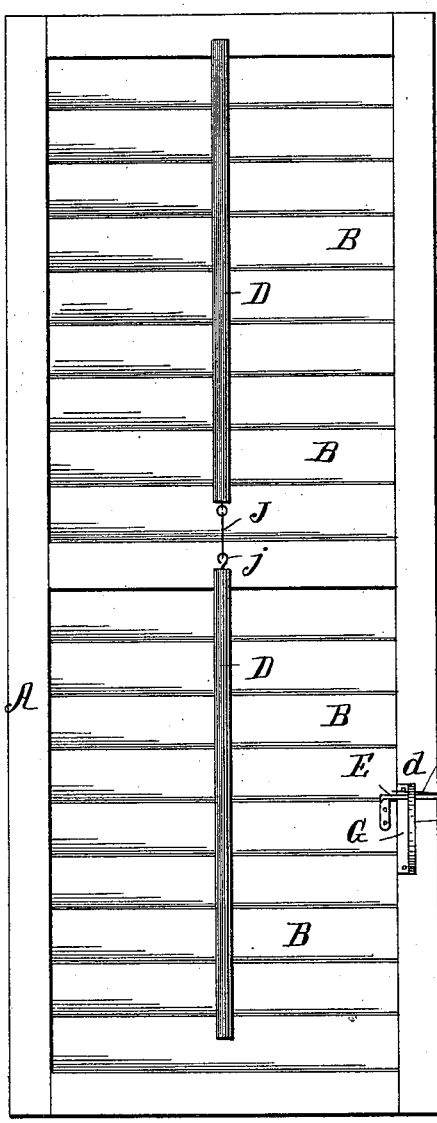
Figure 2:
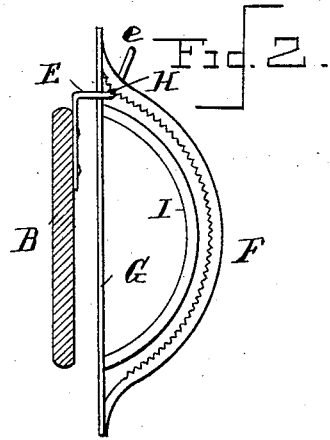
Figure 3:
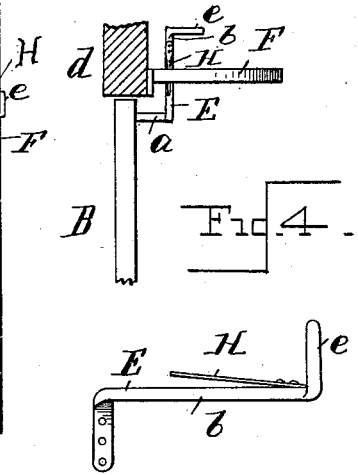
Figure 4:
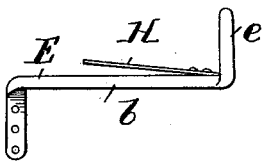

Figure 1 is a face view of a window-blind having my improvement applied. Fig. 2 is an enlarged side elevation of my improvement, the window-slat being in section. Fig. 3 is a top view of the same, and Fig. 4 is an enlarged detail view of the handle.

The letter A in the accompanying drawings indicates a window-blind having one or more series of slats B, each series being connected by a bar D, as usual. On one of the slats B is secured a handle or arm E, by which the slat can be operated and held. The handle E may be of suitable shape; but is preferably bent outwardly at $a$, then sidewise at $b$ to extend along the outer side $d$ of the blind-frame, and then outwardly at $e$ to be grasped, as shown.

F is a toothed rack to hold the handle E and it is carried by the blind-frame, preferably on the vertical side $d$ thereof. (See Fig. 1.) The rack F is in Fig. 2 shown in the arc of a circle approximating that described by the handle E as it is carried by the slat B, the teeth being on the under side. The rack F may or may not have a base-piece G, connecting its ends, as in Figs. 1 and 2, by which it can be secured to the blind-frame, or it may be otherwise suitably secured.

The handle E is to be held by the rack F, and for this purpose the handle may be made of spring metal to cause it to engage the rack, or it may carry a suitable spring H, that will enter the teeth of the rack to hold the handle. In Fig. 4 a flat spring H is shown riveted to the handle E and projecting outwardly at its free end to engage the teeth of the rack F. By placing the handle E under the rack F it is prevented from being pulled outwardly, and to prevent it from being pushed inwardly I may place a curved guide-bar I under the handle E, as in Fig. 2, whereby the handle will travel between the rack F and guide I.

In order that only one fastener need be used for all the series of slats B that may be on a blind, I provide an adjustable connection J to connect the bars D D of the series of slats, as in Fig. 1. This connection J may consist of a bar that is carried by one bar D—say the upper one—and connects with the lower one by a hook $j$. By means of this connection when one series of slats is manipulated or held all the connected ones will be also, while the series of slats can all be disconnected at will and only one series manipulated.

By means of my improved fastener the slats can be easily turned, and they will be locked in any desired position and held open at any angle desired. To turn the slats, it is merely necessary to press the spring out of engagement with the rack-teeth. The latter will hold the handle against movement either from the wind or other extraneous cause.

This improvement is also a protection against burglars, as when the slats B are closed a person from the outside cannot press his fingers between the slats without breaking something, and thus making a noise.

My improvement will be found very cheap to manufacture, simple to operate, and effective in use, as the slipping of the slats is overcome.

Having now described my invention, what I claim is—

The combination of a handle to be attached to a blind-slat, said handle having a horizontal arm carrying a spring-catch, with a segmental rack-bar adapted to be affixed to the blind-frame in the plane of rotation of the slat, having an internal segmental rack adapted to engage said spring-catch, substantially as described.

Signed at New York, in the county of New York and State of New York, this 14th day of October, A. D. 1891.

WM. E. MacLACHLAN.

Witnesses:
  T. F. BOURNE,
  J. T. KILHAM.